(12) United States Patent
Peacock

(10) Patent No.: US 9,319,330 B2
(45) Date of Patent: Apr. 19, 2016

(54) APPARATUS AND METHOD FOR AVOIDING PACKET LOSSES IN A NETWORK CONNECTION

(75) Inventor: John Kent Peacock, Menlo Park, CA (US)

(73) Assignee: Oracle International Corporation, Redwood City, CA (US)

( * ) Notice: Subject to any disclaimer, the term of this patent is extended or adjusted under 35 U.S.C. 154(b) by 1174 days.

(21) Appl. No.: 13/242,932

(22) Filed: Sep. 23, 2011

(65) Prior Publication Data

US 2013/0080842 A1    Mar. 28, 2013

(51) Int. Cl.
*G06F 15/16*    (2006.01)
*G06F 15/173*    (2006.01)
*H04L 12/807*    (2013.01)
*H04L 1/00*    (2006.01)

(52) U.S. Cl.
CPC .............. *H04L 47/27* (2013.01); *H04L 1/0002* (2013.01); *Y02B 60/31* (2013.01)

(58) Field of Classification Search
USPC ......... 709/231, 203, 217, 219, 223, 224, 232, 709/233; 714/752; 348/184; 370/216, 232, 370/235, 252, 328, 420
See application file for complete search history.

(56) References Cited

U.S. PATENT DOCUMENTS

| | | | |
|---|---|---|---|
| 5,884,037 A | 3/1999 | Aras et al. | |
| 6,208,640 B1 | 3/2001 | Spell et al. | |
| 6,438,141 B1 | 8/2002 | Hanko et al. | |
| 6,560,243 B1 | 5/2003 | Mogul | |
| 6,654,806 B2 | 11/2003 | Wall et al. | |
| 6,947,445 B1 | 9/2005 | Barnhart | |
| 6,993,044 B2 | 1/2006 | McKinnon, III et al. | |
| 6,996,132 B1 | 2/2006 | Tolety | |
| 7,027,403 B2 | 4/2006 | Porikli et al. | |
| 7,532,642 B1 | 5/2009 | Peacock | |
| 7,821,937 B1* | 10/2010 | Guo | 370/232 |
| 7,881,200 B2* | 2/2011 | Lee et al. | 370/235 |
| 8,209,430 B2* | 6/2012 | Barreto et al. | 709/231 |
| 8,233,438 B2* | 7/2012 | Wise et al. | 370/328 |
| 8,738,986 B2* | 5/2014 | Srinivas et al. | 714/752 |
| 8,775,658 B2* | 7/2014 | Barreto et al. | 709/231 |
| 8,885,050 B2* | 11/2014 | Wang et al. | 348/184 |
| 2006/0250949 A1* | 11/2006 | Ramakrishnan et al. | 370/216 |
| 2008/0049777 A1* | 2/2008 | Morrill et al. | 370/420 |
| 2011/0019555 A1* | 1/2011 | Gotoh et al. | 370/252 |

\* cited by examiner

*Primary Examiner* — Quang N Nguyen

(74) *Attorney, Agent, or Firm* — Brooks Kushman P.C.

(57) ABSTRACT

In one embodiment, an apparatus for avoiding packet losses is provided. The apparatus includes a first communication device that is configured to receive packets of data over a network from a second communication device and to store information indicative of a sliding window that corresponds to a predetermined number of packets of data. The first communication device is further configured to determine a number of lost packets of data from within the sliding window in response to receiving the packet of data and to determine a maximum value from the sliding window. The maximum value corresponding to a maximum number of lost packets of data for a number of sliding windows. The first communication device is further configured to control the second communication device to adjust a bandwidth rate at which the packets of data are transmitted over the network based on at least the maximum value.

14 Claims, 3 Drawing Sheets

APPARATUS AND METHOD FOR AVOIDING PACKET LOSSES IN A NETWORK CONNECTION

TECHNICAL FIELD

Embodiments of the present disclosure generally relate to an apparatus and method for avoiding packet losses in a network connection.

BACKGROUND

Thin clients are generally defined as clients that perform little or no local data processing. Such thin clients may rely on central computer such as a server to execute applications. The clients and the server are coupled to one another via a network. The server generally provides audio and video data over the network to the thin client (e.g., a desktop device). The desktop device may play back the audio data or display the video data as such data is received from the server.

Depending on the application, a transmission speed of a network connection between a thin client and a server may vary. For example, the transmission speed may vary from 300 Kbits per second on a Digital Subscriber Line (DSL) line to around 100 Mbits per second in a Local Area Network (LAN). Higher speed network connections may enable the thin client to perform at a higher performance level assuming the network connection is a bottle neck instead of processing capability at the central computer. In general, since thin clients depend heavily on the throughput of a communication link with the server, the communication link needs to be used as efficiently as possible particularly as it relates to the amount of available bandwidth for transmitting audio and video data.

Characteristics of data sent to a thin client (e.g., desktop unit) may be different than most network traffic (e.g., files or web pages) which is transmitted in accordance with an acknowledgment based protocol such as TCP/IP (Transmission Control Protocol/Internet Protocol). One potentially significant property associated with file transfer and web page accesses is that all of the data typically should be reliably delivered reliably and correctly ordered to the application attempting to access such data. Even the loss of a single byte of data may be unacceptable. The standard TCP, on top of the IP (such as TCP/IP), supports data transmissions with the desirable property that lost data packets are retransmitted until all data is properly received at a receiver. For example, if data is lost during transmission, the TCP protocol causes retransmission of lost data until the sender acknowledges receipt of the data. Delays and throttling mechanisms are sometimes implemented in TCP sending and retransmission algorithms to make efficient use of the available bandwidth and to avoid causing over-congestion in the network.

In a thin client environment, time is generally of the essence. Audio data in a thin client application should be received at the thin client at the right time to drive an output device (e.g., such as a speaker). If not, the audio output from the speaker may be of poor quality. A smooth audio output may be achieved through the use of buffering at the thin client to allow for time variance of receiving audio packets. Unlike a Transmission Control Protocol (TCP), loss of an audio packet in the network does not cause the sender to retransmit that particular data. This condition exists largely because real time data that is received too late in time is generally useless for playback purposes. One network protocol that may accommodate data transmission between one or more thin clients and the server is the UDP over the Internet Protocol (IP). UDP, while beneficial, allows an unreliable transmission of packets. Accordingly, a higher level protocol may be needed to recover lost or mis-ordered packets.

SUMMARY

In at least one embodiment, an apparatus for avoiding packet losses is provided. The apparatus includes a first communication device that is configured to receive packets of data over a network from a second communication device and to store information indicative of a sliding window that corresponds to a predetermined number of packets of data. The first communication device is further configured to determine a number of lost packets of data from within the sliding window in response to receiving the packet of data and to determine a maximum value from the sliding window. The maximum value corresponding to a maximum number of lost packets of data for a number of sliding windows. The first communication device is further configured to control the second communication device to adjust a bandwidth rate at which the packets of data are transmitted over the network based on at least the maximum value.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Figure 1:
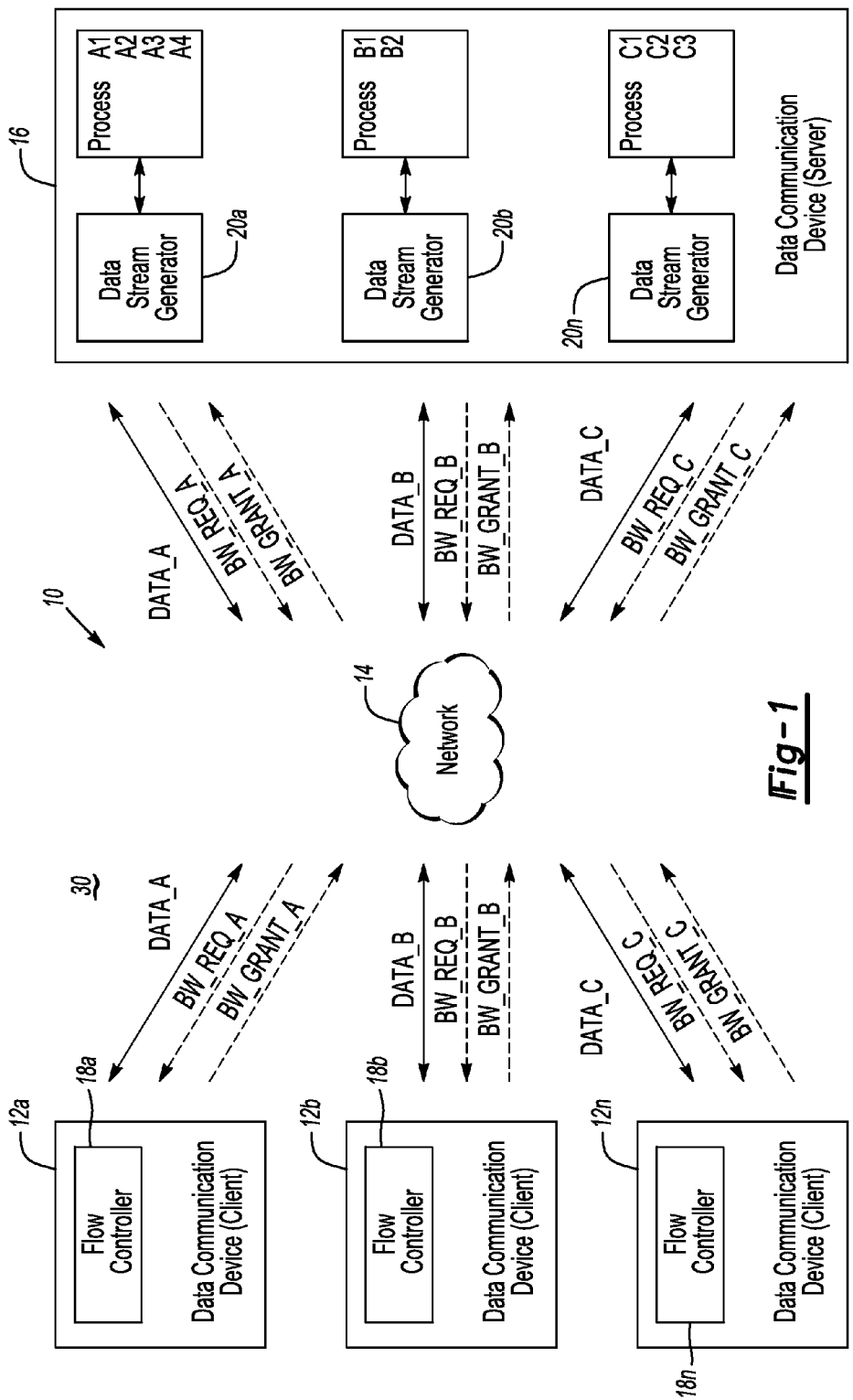
FIG. 1 depicts an apparatus for adaptively avoiding packet losses in a communication system in accordance to one embodiment.

The embodiments set forth herein generally illustrate and describe a number of electrical based devices or controllers that may be implemented in at least one thin client and a server. All references to the various electrically based components and the functionality provided for each, are not intended to be limited to encompassing only what is illustrated and described herein. While particular labels may be assigned to the various electrically based components disclosed, such labels are not intended to limit the scope of the operation thereof. It is generally recognized that each electrically based component disclosed herein may include, but not limited to, any number of microprocessors, ICs, discrete analog devices, memory devices (e.g., FLASH, RAM, ROM, EPROM, EEPROM, or other suitable variants thereof), and software which co-act with one another to perform the various functions set forth below.

In general, conventional techniques for bandwidth allocation may suffer from certain deficiencies. For example, just as UDP has no provisions for re-transmitting lost packets, it also has no mechanism, as TCP does, to avoid transmitting at a rate that could flood the network with excess traffic. Transmitting at too high of a rate can cause network congestion and result in a very poor use of a network link. Thus, it is desirable for a thin client computer system to implement some sort of flow control mechanism to avoid saturating a network with traffic.

Certain central computers, such as a Sun Ray® server may generate screen updates at a maximum rate that is close to 70 megabits per second. Such a condition may saturate at 300 kilobits per second DSL line. Certain conventional methods may include the use of a flow control mechanism at the central computer which clamps the output rate of data transmitted from the server to the thin client. However, conventional flow control mechanisms may clamp the bandwidth rate far lower than the network can actually support. As such, associated network connections may be under-utilized.

To mitigate this problem and other problems, one implementation as disclosed in U.S. Pat. No. 7,532,642 (the '642 patent) and filed on Mar. 11, 2004, which is hereby incorporated by reference in its entirety, may provide for a better approximation of actual available bandwidth associated with a network or part thereof. When transmitting data packets near or at a rate of the actual available bandwidth, fewer data packets may be lost and a client device may operate closer to its fullest potential. In such a case, a transmitter (e.g., a server) can be reasonably certain that a receiver (e.g., a thin client) may likely receive the data packets, barring the occurrence of some other system failure.

In one application as set forth in the '642 patent, a thin client device (e.g., a Sun Ray® desk top unit) incorporates a stateless design for a client based on connecting to a user's session from one of multiple desktop devices. Thus, a same session can be accessed using a 100 Mbps LAN connection of a corporate setting or a 300 Kbps DSL line in a user's home. Depending on the characteristics of the link, software on the central computer may quickly detect the availability of bandwidth when a connection is made to a user's session and adjusts the bandwidth accordingly. For example, as bandwidth availability increases, the central computer receives a notification to transmit data at a higher data rate. Conversely, as bandwidth availability decreases, the central computer receives a notification to transmit data at a lower data rate.

In general, the '642 patent as described above may, among other things, control the flow of data over a network by issuing grants of bandwidth from a thin client(s) to the server. The server may use such grants of bandwidth to control a transmission rate therefrom. The thin client may measure the maximum actual bandwidth to generate the granted bandwidth. At times, the thin client may grant a bandwidth that is higher than the amount actually measured. In some instances, the granted bandwidth may be up to twice the amount of measured bandwidth. The thin client may grant the bandwidth based on a formula that uses a round-trip latency measurement.

In the '642 patent, once the measured bandwidth reaches a true available maximum bandwidth, the amount of bandwidth granted by the thin client may exceed the bandwidth amount that is feasibly possible. In such a case, the overall capacity of the connection may be reduced to the extent that an overflow condition occurs which may lead to a loss of data packets (e.g., audio and video data). This pattern of loss may exhibit itself as a short burst of lost data packets in the event the thin client grants the bandwidth at a high amount. The packet loss and increase in latency in the network connection may cause the thin client to scale back the amount of granted bandwidth to a value that represents an amount of bandwidth that is truly available. As soon as the data that is queued in the network connection drains and increased connection capacity is available, the thin client may increase the amount of bandwidth granted and the cycle repeats itself. While average packet losses are used to adjust the average granted bandwidth downward, such losses may exhibit a large burst thereby causing the average loss rate to stay fairly low. Due to the packet losses exhibiting a large burst, such a condition may generate undesirable artifacts when data is being rendered for display on a screen.

FIG. 1 depicts an apparatus 10 for adaptively avoiding packet losses in a communication system 30 in accordance to one embodiment. The apparatus 10 includes a plurality of first data communication devices (e.g., clients) 12a-12n ("12"), a network 14, and a second data communication device (e.g., central computer or server) 16. In general, each client 12 may be implemented as a thin client, which may perform little to no local data processing. Each client 12 may depend on the server 16 to execute various applications that are needed thereof. In one example, each client 12 may be implemented as a Sun Ray® desk top unit and may communicate with the server via the network 14 through the use of a User Datagram Protocol (UDP) network protocol.

Each client 12 may include a flow controller 18 (e.g., client 12a includes flow controller 18a, client 12b includes flow controller 18b, and so on). The server 16 generally includes a plurality of data stream generators 20a-20n ("20"). Each data stream generator 20 may transmit data (e.g., audio and/or video data) to a corresponding client 12 for various processes. For example, data stream generator 20a may transmit data as it relates to any one or more processes A1, A2, A3, A4, etc. over the network 14 on a signal DATA_A to the client 12a. Similarly, data stream generator 20b may transmit data as it relates to any one or more processes B1, B2 etc. on the network 14 on a signal DATA_B to the client 12b. Likewise, data stream generator 20n may transmit data as it relates to any one or more processes C1, C2, C3 etc. over the network connection 14 on signal DATA_C to the client 12n. Any one or more of the signals DATA_A-DATA_C may be referred to generally as signal DATA.

Each client 12 is generally configured to grant a specified amount of bandwidth to the server 14 such that the corresponding data stream generator 20 transmits data associated with each process at the bandwidth designated by the client 12. For example, data stream generator 20a may transmit a signal BW_REQ_A with corresponds to a requested amount of bandwidth to the client 12a. The data stream generator 20a requests the amount of bandwidth such that the data on the signal DATA_A is transmitted based on the bandwidth that is authorized by the client 12a. The client 12a generally measures the rate at which it receives data and determines the bandwidth at which the data stream generator 20a transmits such data. The client 12a transmits a signal BW_GRANT_A that corresponds to a granted amount of bandwidth to the data stream generator 20a. The client 12 may assign each of the processes A1, A2, A3, A4 at a particular bandwidth based on priority.

In a similar fashion, the data stream generator 20b may transmit a signal BW_REQ_B with corresponds to a requested amount of bandwidth to the client 12b. The data stream generator 20b requests the amount of bandwidth such that the data on the signal DATA_B is transmitted based on the bandwidth that is authorized by the client 12b. The client 12b generally measures the rate at which it receives data and determines the bandwidth at which the data stream generator 20b transmits such data. The client 12b transmits a signal BW_GRANT_B that corresponds to a granted amount of bandwidth to the data stream generator 20b. The client 12b may assign each of the processes B1, B2 etc. at a particular bandwidth based on priority.

Likewise, the data stream generator 20n may transmit a signal BW_REQ_N with corresponds to a requested amount of bandwidth to the client 12n. The data stream generator 20n requests the amount of bandwidth such that the data on the signal DATA_N is transmitted based on the bandwidth that is authorized by the client 12n. The client 12n generally measures the rate at which it receives data and determines the bandwidth at which the data stream generator 20n transmits such data. The client 12n transmits a signal BW_GRANT_N that corresponds to a granted amount of bandwidth to the data stream generator 20n. The client 12n may assign each of the processes C1, C2, C3 etc. at a particular bandwidth based on priority.

It is recognized that the amount of bandwidth granted by the clients 12 is dynamic and changes over time based on system 30 conditions. The clients 12a-12n may receive data on the signals DATA_A-DATA_N, respectively that are associated with processes A1-A4, B1-B2, and C1-C3, respectively. For example, client 12a may receive data generated by processes A1, A2, A3, and A4 to drive various output devices such as displays, speakers, headphones, etc. Data transmitted from the server 16 may include information that is played back in real-time. It is recognized that each client 12 is a thin client that relies on the server 16 to perform a significant amount of application and data processing.

In a reverse direction, the clients 12 may also transmit data back to the server 14. The corresponding signals DATA_A-DATA_N may be used to depict this condition. Signals DATA_A-DATA_N generally correspond to data that is transmitted from the client 12 to the server 16, and from the server 16 back to the client 12. Data transmitted from any one or more of the clients 12 may comprise information provided by a user such as keyboard input information, mouse movement information, files, etc. Data processing functions executed at the server 16 provide processing services that would otherwise be provided at a local terminal such as a personal computer system. By providing processing services at the server 16 rather than at a local host computer, such a condition may enable multiple users to share use of common device terminals. Thus, processes supported at the server 16 may be accessed from multiple different terminal sites over the network 14.

In general, each user associated with the apparatus 10 may be assigned a portable circuit card that plugs into each desktop unit (or client 12). The portable card may identify the corresponding user such that, when the portable card is plugged into a terminal device, a user may access his/her applications and corresponding processes at the server 16. The user may log off at one terminal device (e.g., at client 12a) and reconnect to the server 16 via another terminal device (e.g., at client 12n) without losing any state information associated with corresponding user processes. In other words, server 16 may maintain processes A1, A2, A3, A4 so that a corresponding user may access them from different thin client terminals in a single day.

At any given time, specified transmission rates may be in force. For example, the flow controllers 18 at the clients 12 may determine the allocated rate of transmitting data from the server 16 using measurements of the maximum rate at which data have been received, and a measured RTT (Round Trip Time) associated with communications between a client 12 and the server 16. As discussed, the flow controllers 18 may estimate the real bandwidth available for receiving data from server 16. In response, the flow controllers 16 may allocate use of the available bandwidth to competing services (e.g., processes A1, A2, A3, A4, etc.) for each connection.

As noted in the '642 patent, the clients 12 and, more specifically, the flow controllers 18 may maintain sets of parameters (e.g., variables) to adaptively change bandwidth allocation depending on apparatus conditions. Such parameters may include the following:

| | |
|---|---|
| currRTT | which is a minimum of currently measured RTTs associated with a client and each of the corresponding competing processes (e.g., processes A1, A2, A3, and A4) transmitting data from the server 16 to corresponding client 12 |
| minRTT | which is a minimum currRTT detected during a particular user communication session |
| avgbw | which is an estimate of the true available bandwidth which, in one applications, involves measuring a rate of receiving data at a given client 12 |
| bwlimit (curr) | which is a total identified available bandwidth for allocation among corresponding processes (e.g., process A1, A2, A3, and a4) associated with a client 12 |

A method of computing the RTT may involve identifying a time associated with transmitting a communication from a client 12 to the server 16 plus a time associated with transmitting a communication from the server 16 to the client 12. For example, the flow controller 18 may measure RTT based on a time between sending a bandwidth grant message (e.g., a bandwidth metric indicating a proposed rate of sending data) over the signal BW_GRANT (e.g., one or more of the signals BW_GRANT_A-BW_GRANT_N) to the server 16 and receiving a message back from the server 16. In one embodiment the bandwidth grant message on the signal BW_GRANT may include a contract number (e.g., a unique identifier) associated with the bandwidth allocation. Upon implementing a new contract and bandwidth allocation grant, the server 16 may tag messages associated with the contract grant or bandwidth allocation grant with the unique identifier. Thus, in one example, the flow controller 18a may measure RTT based on an elapsed time between sending a new contract number and detecting a first data packet including the unique identifier associated with the newly assigned contract, less any time delay associated with the server 16 replying to a new bandwidth allocation grant. For example, a round trip time can take into account a time between the server 16 (i) receiving a communication from the client 12 and (ii) transmitting a communication, in response to receiving the communication, to the client 12. In other words, an accurate RTT measurement may include time associated with transmitting a communication from a client 12 to the server 16 plus a time associated with transmitting a communication from the server 16 to the client 12.

A corresponding flow controller 16 may set the avgbw parameter for a particular client session to the highest average bandwidth associated with data received at a client 12 from the server 16 as detected during specified intervals such as half second time intervals. The avgbw parameter generally represents a best estimate of the true available bandwidth for receiving data from the server 16 on a particular network link. Note that the flow controller 16 may adjust a value of the avgbw parameter depending on an amount of lost data packets. For example, the flow controller 18 may adjust the avgbw parameter downward whenever a corresponding client 12 detects multiple lost packets during a given half second measurement interval. The adjustment downward may be a fraction (such as ⅛) of the currently measured bandwidth.

In general, the flow controllers 18 may compute the bandwidth metric, bwlimit, as a function of the variables, namely currRTT, minRTT, and MSDELAY. MSDELAY is generally defined as a constant as discussed below. A newly generated value of the bwlimit parameter may be set to a value significantly higher or lower than avgbw depending on a value of the currRTT parameter. In other words, an amount of bandwidth granted for use by the server 16 to transmit data to a respective client 12 depends on a recently measured RTT of communications between the client 12 and the server 16. In one embodiment, the formula for calculating the bandwidth limit (e.g., bwlimit(curr)) as determined by the client 12 (e.g., bwlimit(curr)) is as follows:

$$\text{bwlimit(curr)}=(\text{currRTT}+\text{minRTT}+\text{MSDELAY})*\text{avgbw}/(2*\text{currRTT}) \quad (\text{EQ. 1})$$

where MSDELAY is a target acceptable value of RTT above minRTT. MSDELAY (e.g., millisecond delay) is generally defined as a function (e.g., not necessarily a liner function) of minRTT. For example, the flow controller 18 may set MSDELAY to 100 msec which is approximately n times a lowest value of the minRTT parameter (e.g., when measured to be 20 ms), and where n=5. In another example, MSDELAY may be a function of the maximum or average value of currRTT over some time period. In another embodiment, MSDELAY=C+n*minRTT, where C is a constant (e.g., 100 milliseconds) and n is an integer greater than or equal to zero. Thus, MSDELAY may be a constant (e.g., when n=0) or a function of another parameter (e.g., minRTT) depending on the application. In another example, MSDELAY may be set to 2*minRTT, with minimum and maximum constraints on its value, such as 20 and 100 milliseconds, respectively. The effect of this choice when minRTT is between 10 and 50 milliseconds, is that bwlimit(curr) may range between 2*avgbw when currRTT=minRTT, that is the network is uncongested, and avgbw/2 when currRTT>>minRTT, that is the network 14 may be very congested. When minRTT and currRTT are low, as in a local connection, bwlimit(curr) may be a larger multiple of avgbw. For example, if currRTT=minRTT=1 millisecond, then bwlimit=(1+1+10)*avgbw/(2*1)=6*avgbw. This behavior may allow for a fast detection of large available bandwidth in a local 100 mbps network.

As noted above, the apparatus 10 may control the flow of data over the network 14 by issuing grants of bandwidth from any one or more of the clients 12 to the server 16. The server 16 may use such grants of bandwidth to control a transmission rate therefrom. The client 12 may measure the maximum actual bandwidth to generate the granted bandwidth. At times, the client 12 may grant a bandwidth that is higher than an amount actually measured. In some instances, the granted bandwidth may be up to twice the amount of measured bandwidth.

Once the measured bandwidth reaches a true available maximum bandwidth, the amount of bandwidth granted by a particular client 12 may exceed the bandwidth amount that is feasibly possible. In such a case, the overall capacity of the connection may be reduced to the extent that an overflow condition occurs which may lead to a loss of packets (e.g., audio and video data). This pattern of loss may exhibit itself as a short burst of lost packets in the event the client 12 grants the bandwidth at a high amount. The packet loss and increase in latency in the network 14 may cause the client 12 to scale back the amount of granted bandwidth to a value that represents an amount of bandwidth that is truly available. As soon as the data that is queued in the network 14 drains and increased connection capacity is available, the client 12 may increase the amount of bandwidth granted and the cycle repeats itself. While average packet losses are used to adjust the average granted bandwidth downward, such losses may exhibit a large burst thereby causing the average loss rate to stay fairly low. Due to the packet losses exhibiting a large burst, such a condition may generate undesirable artifacts when data is being rendered for display on a screen.

In view of the foregoing, the apparatus 10 is generally configured to observe packet (e.g., packets of data) losses in short bursts as a mechanism to adaptively adjust an upper limit of the bandwidth based on the following parameters:

| | |
|---|---|
| N | Predetermined number of packets of data in sliding window |
| L | Number of lost packets of data within the sliding window |
| Lmax | Maximum number of lost packets of data over a number of sliding windows |
| bwlimit (curr) | Current bandwidth limit that is granted to the server 16 by the client 12 (e.g., this the current amount of available granted bandwidth) |
| bwlimit (adj) | New bandwidth limit that is granted to the server 16 by the client (e.g., this the new amount of available granted bandwidth) |
| I | Predetermined amount of time |

In general, a packet sequence number is assigned to each packet of data when transmitted over the network 14. Such packet sequence numbers may be used in connection with, but not limited to, the Sun Ray® protocol. Through the use of the packet sequence numbers, it is possible to determine when and which packets of data have been lost. The apparatus 10 may employ a sliding window that is defined by the predetermined number of packets of data (N). The apparatus 10 may determine the number of lost packets (L) in the sliding window of N packets by monitoring the packet sequence numbers and corresponding packets. In the event the number of lost packets (L) exceeds the maximum number of lost packets Lmax, where Lmax is set to an initial default number of packets and additional conditions are met (e.g., this will be explained in more detail in connection with FIG. 3), then Lmax=L. Lmax generally corresponds to a maximum number of lost packets for a number of sliding windows.

Accordingly, the apparatus 10 may calculate an adjusted bandwidth limit based on the following:

$$\text{bwlimit(adj)}=\text{bwlimit(curr)}-(L\text{max}*\text{bwlimit(curr)})/N \quad (\text{Eq. 2})$$

Thus, the server 16 transmits one or more of the signals DATA_A, DATA_B, and DATA_N at the granted bandwidth as indicated by bwlimit(adj). It is recognized that the apparatus 10 calculates bwlimit(curr) (via EQ. 1) and bwlimit(adj) (via EQ. 2) continuously from the start of the client 12 server 16 connection. It is further recognized that bwlimit(adj) is indicative of a reduced bandwidth that may prevent packet bursts. This condition may mitigate the condition in which the client 12 grants a bandwidth that is higher than an amount actually measured. Likewise, bwlimit(adj) may minimize or eliminate undesirable artifacts caused by packet loss bursts. One or more of the clients 12 may transmit data indicative of bwlimit(adj) on the signal BW_GRANT to the server 16 such that the server 16 transmits packets of data at the bandwidth amount indicated on bwlimit(adj).

Since bandwidth limitations or packet losses may be temporary, the apparatus 10 may also decay (or decrease) Lmax at periodic intervals (e.g., every 0.5 seconds or other suitable time) by a predetermined amount to account for transient conditions. However, such a reduction in Lmax may be employed when the number of lost packets of data, L is set to zero or other suitable value. By decreasing Lmax, such a condition may cause bwlimit(adj) to increase, thereby enabling data to be reliably transmitted to the client 12 at a faster rate. For example, consider that a single lost packet of data is detected in a single window having a predefined size of 32 packets. Such a lost packet of data may be part of 32 adjacent sliding windows where Lmax will be set to one. If there are no further lost packets of data in the next 0.5 seconds, then Lmax may be decreased by one and set back to zero.

Figure 2:
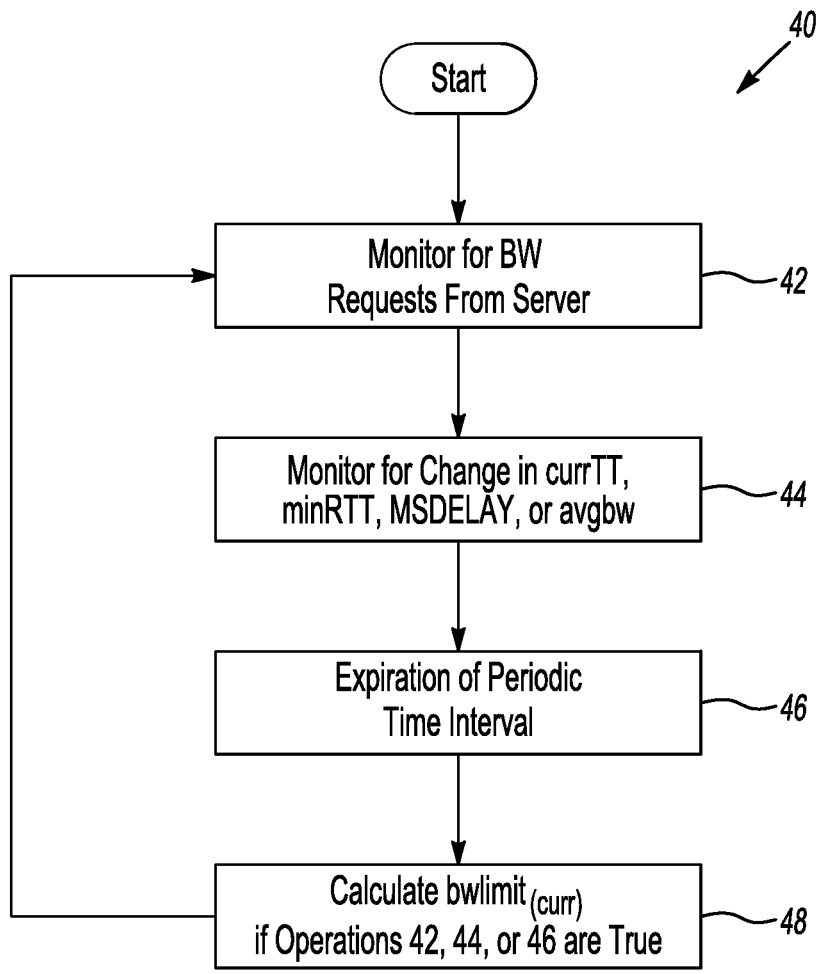
FIG. 2 depicts a method for determining various conditions for calculating the bandwidth limit.

FIG. 2 depicts a method 40 for determining various conditions calculating the bandwidth limit (e.g., bwlimit(curr)).

The particular order of the operations in the method 40, when executed, may be in any order and are not intended to be limited to only being performed sequentially. The order of the operations may be modified or varied based on the desired criteria of a particular implementation. The method 40 as set forth below describes the operations as executed by the client 12 for purposes of brevity. It is recognized that operations noted in connection to client 12 is generally applicable to one or more of the clients 12a-12n as well.

In operation 42, the client 12 monitors for any bandwidth requests that may have been received (as transmitted by the server 16).

In operation 44, the client 12 monitors for any change in variables currRTT, minRTT, MSDELAY or avgbw.

In operation 46, the client 46 determines whether a periodic time interval has expired. In one example, the periodic time interval may correspond to 0.5 seconds. It is recognized that the value selected for the periodic time interval may vary based on the desired criteria of a particular implementation.

In operation 48, the client 48 calculates bwlimit(curr) if any of the operations 42, 44, or 46 are true. The method 40 is executed as soon as the connection between the client 12 and the server 16 is made.

Figure 3:
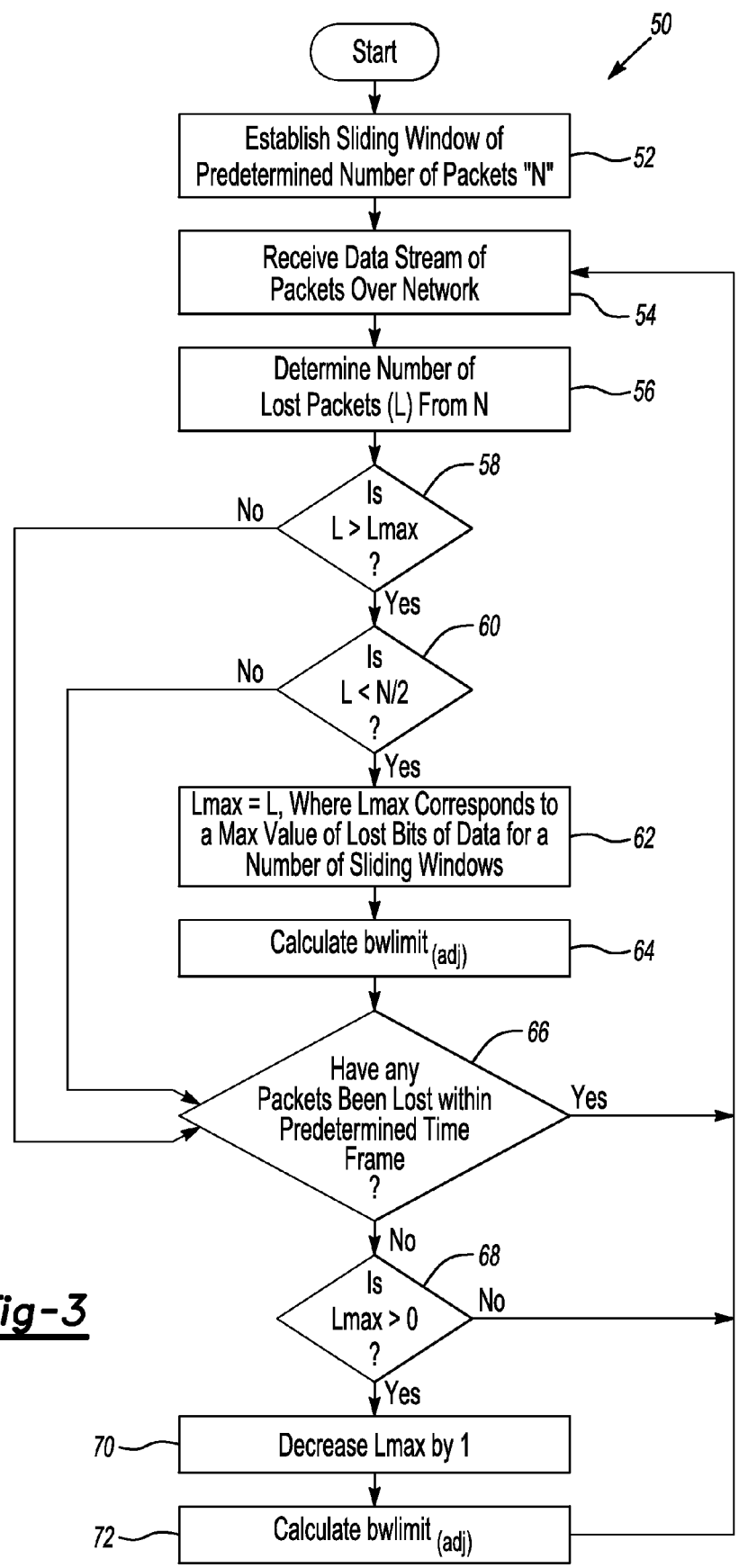
FIG. 3 depicts a method for adaptively avoiding packet losses in the communication system in accordance to one embodiment.

FIG. 3 depicts a method 50 for adaptively avoiding packet losses in the communication system 30 in accordance to one embodiment. The particular order of the operations in the method 50, when executed, may be in any order and are not intended to be limited to only being performed sequentially. The order of the operations may be modified or varied based on the desired criteria of a particular implementation. The method 50 as set forth below describes the operations as executed by the client 12 for purposes of brevity. It is recognized that operations noted in connection to client 12 is generally applicable to one or more of the clients 12a-12n as well.

In operation 52, the client 12 establishes the sliding window as defined by the predetermined number of packets, N. In one example, N may correspond to 32 packets. It is recognized that the actual number of packets which form N may vary based on the desired criteria of a particular implementation. It is further recognized that N used by client 12 may be the same for any number of clients 12 or may be different for any number of clients 12. It is also recognized that N can be the same for two clients and different for a third client, etc.

In operation 54, the client 12 receives data on the signal DATA over the network connection 14 from the server 16.

In operation 56, the client 12 determines L (e.g., the number of lost packets of data from N). As noted above, each packet of data as transmitted on the signal DATA may correspond to a packet sequence number. The client 12 determines whether a packet that corresponds to a particular packet sequence number has been received. In the event various packets have not been received as the client 12 monitors corresponding packet sequence numbers within the sliding window, the client 12 determines the number of lost packets, L accordingly.

In operation 58, the client 12 determines whether L is greater than Lmax. Lmax is generally set to zero at the initialization of the connection between the client 12 and the server 16. If L is not greater than Lmax, then the method 50 moves back to operation 54. In this case, the client 12 determines that there may not be a burst of packets that are lost. If L is greater than Lmax, then the method 50 moves to operation 60. In this condition, the client 12 determines that there may be bursts of packet loss over the network 14. Lmax generally corresponds to a maximum number (or value) of lost packets for a group of sliding windows. In general, each sliding window overlaps with one another. As such, in the event a single lost packet of data is detected in a particular sliding window having a window size of 32 packets, such a lost packet may be part of 32 adjacent sliding windows. Due to this condition, Lmax is set to one for the number of adjacent sliding windows (e.g., the 32 adjacent sliding windows).

As noted above, in one example, the burst of lost packets may occur, in one example, if the client 12 grants a bandwidth amount for the server 16 to transmit to that is actually higher than the bandwidth amount at which the packets of data can be transmitted therefrom. If L is not greater than Lmax, then the method 50 moves to operation 66.

In operation 60, the client 12 determines whether the number of lost packets, L is less than (N/2). The purpose of this calculation may limit the bwlimit(adj) downward to be no more than a factor of ½. If the above condition is true, then the method 50 moves to operation 62. If not, then the method 50 moves to operation 66.

In operation 62, the client 12 sets Lmax equal to the number of lost packets, L.

In operation 64, the client 12 calculates bwlimit(adj) (see EQ. 2 above). In general, the bwlimit(curr) is adjusted downward as a result of calculating bwlimit(adj). The client 12 may use the most recent bwlimit(curr) (as determined in method 40) in EQ. 2 when calculating bwlimit(adj).

In operation 66, the client 12 determines whether any packets have been lost within a predetermined time frame (e.g., lost packets, L in last I seconds). The predetermined time frame (e.g., I) may correspond to 0.5 seconds or other suitable value. If packets have been lost with I, then the method 50 moves to operation 54. If no packets of data have been lost within I, then the method 50 moves to operation 70.

In the event no packets of data have been lost with I, such a condition may indicate that the burst of lost packets may be temporary and that it is possible to increase the amount of bandwidth granted to the server 16. In operation 70, the client 12 decreases Lmax by a predetermined amount. In one example, Lmax may be decreased by one or other suitable value.

In operation 72, the client 12 calculates bwlimit(adj) using the decreased Lmax. By decreasing Lmax, such a condition may cause bwlimit(adj) to increase, thereby enabling data to be transmitted to the client 12 at a faster rate.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for avoiding packet losses in a network, the apparatus comprising:

a processor; and a first communication device including the processor and being configured to:

receive packets of data over a network from a second communication device;

store information indicative of a sliding window that corresponds to a predetermined number of packets of data;

determine a number of lost packets of data from the sliding window in response to receiving the packets of data;

determine a maximum value for the sliding window, the maximum value being equal to a maximum number of lost packets of data for a number of sliding windows;

control the second communication device to adjust a bandwidth rate at which the packets of data are transmitted over the network based at least on the maximum value by decreasing the bandwidth rate at which the packets of data are transmitted such that packet losses are avoided in the network based on a least the maximum value;

determine whether any additional packets of data have been lost within a predetermined time frame in response to controlling the second communication device to decrease the bandwidth rate; and decrease the maximum value by a first value in the event no additional packets of data have been lost within the predetermined time frame.

2. The apparatus of claim 1 wherein the first value corresponds to one.

3. The apparatus of claim 1 wherein the first communication device is further configured to control the second communication device to increase the bandwidth rate at which the packets of data are transmitted in response to determining that no additional packets of data have been lost within the predetermined time frame.

4. The apparatus of claim 1 wherein the first communication device is further configured to receive the packets of data over the network in accordance to a User Data Protocol (UDP).

5. The apparatus of claim 1 wherein the first communication device is a thin client.

6. A method for avoiding packet losses in a network, the method comprising:

receiving packets of data over the network from a first communication device;

storing information indicative of a sliding window that corresponds to a predetermined number of packets of data;

determining a number of lost packets of data for the sliding window in response to receiving the packets of data;

determining a maximum value from the sliding window, the maximum value being equal to a maximum number of lost packets of data from a group of sliding windows;

controlling the first communication device to adjust a bandwidth rate at which the packets of data are transmitted over the network based at least on the maximum value by decreasing the bandwidth rate at which the packets of data are transmitted such that packet losses are avoided in the network based on at least the maximum value;

determining whether any additional packets of data have been lost within a predetermined time frame in response to controlling the first communication device to decrease the bandwidth rate; and decreasing the maximum value by a first value in the event no additional packets of data have been lost within a predetermined time frame.

7. The method of claim 6 wherein the first value corresponds to one.

8. The method of claim 6 further comprising controlling the first communication device to increase the bandwidth rate at which the packets of data are transmitted in response to determining that no additional packets of data have been lost within the predetermined time frame.

9. The method of claim 6 wherein receiving the packets of data over the network further comprises receiving packets of data over the network from the first communication device in accordance to a User Data Protocol (UDP).

10. The method of claim 6 wherein receiving the packets of data over the network further comprises receiving, at a thin client, the packets of data from a server over the network.

11. An apparatus for avoiding packet losses in a network, the apparatus comprising:

a processor; and a first communication device including the processor for transmitting packets of data over a network to a second communication device, the second communication device being configured to:

store information indicative of a sliding window that corresponds to a predetermined number of packets of data;

determine a number of lost packets of data from the sliding window in response to receiving the packets of data;

determine a maximum value from the sliding window, the maximum value being equal to a maximum number of lost packets of data for a number of sliding windows; and transmit a signal indicative of an adjusted amount of bandwidth in which packets of data are transmitted over the network based at least on the maximum value;

determine whether any additional packets of data have been lost within a predetermined time frame in response to transmitting the signal to indicate the adjusted amount of bandwidth; and decrease the maximum value by a first value in response to determining that no additional packets of data have been lost within the predetermined time frame;

wherein the first communication device decreases a bandwidth rate at which the packets of data are transmitted such that packet losses are avoided in the network after transmitting the signal.

12. The apparatus of claim 11 wherein the first communication device is configured to decrease the bandwidth rate at which the packets of data are transmitted over the network in response to the signal.

13. The apparatus of claim 11 wherein the first communication device is further configured to transmit the packets of data over the network to the second communication device in accordance to a User Data Protocol (UDP).

14. The apparatus of claim 11 wherein the first communication device is a server and the second communication device is a thin client.

* * * * *